April 18, 1933.  R. BERTHON  1,904,673
PRINTING OF FILMS FOR COLOR CINEMATOGRAPHY
Filed Aug. 2, 1929
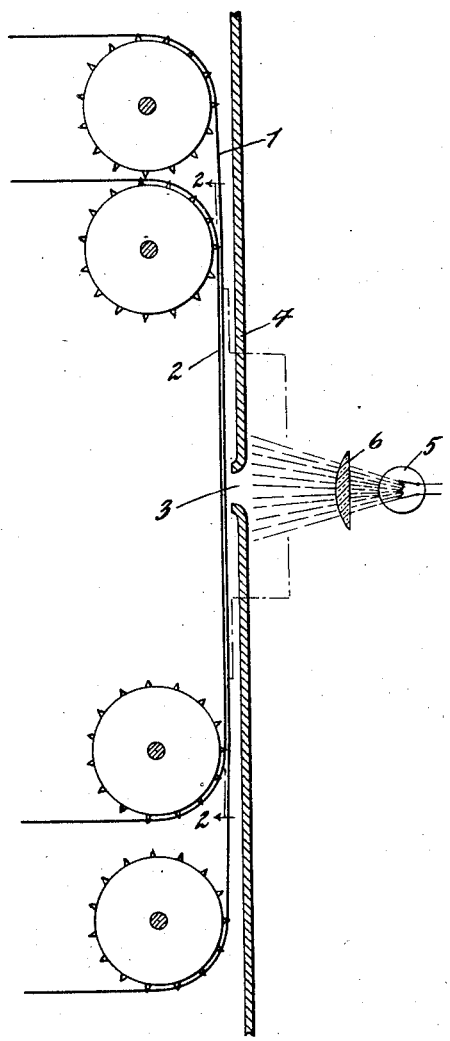
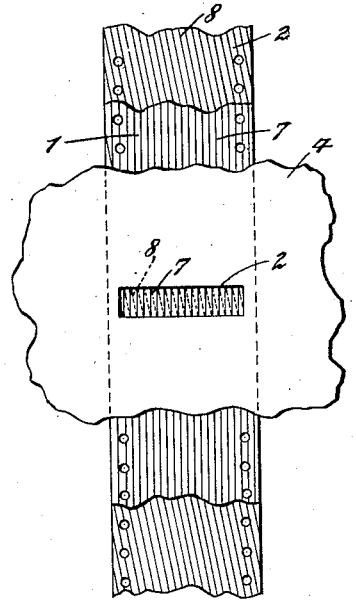
INVENTOR
Rodolphe Berthon
BY
Gifford, Scull & Burgess
ATTORNEYS.

Patented Apr. 18, 1933

1,904,673

UNITED STATES PATENT OFFICE

RODOLPHE BERTHON, OF NEUILLY, FRANCE, ASSIGNOR, BY MESNE ASSIGNMENTS, TO KISLYN CORPORATION, OF NEW YORK, N. Y., A CORPORATION OF DELAWARE

PRINTING OF FILMS FOR COLOR CINEMATOGRAPHY

Application filed August 2, 1929, Serial No. 383,160, and in France August 9, 1928.

The reproduction by contact of gauffered films intended for cinematographic projection in colors (R. Berthon's process) is based on the fact that when two gauffered films are placed against each other, gauffering against gauffering, each of the corrugations of each of the films works individually as independent collimators reproducing respectively line for line in their focal plane the image inscribed in the focal plane of the collimator opposite. No setting is naturally required in the respective position of these linear collimators, and it is just this that makes it possible to eliminate the blurs or fringes by a simple oscillation of the beam of light during the exhibition, as has been stated in the United States Patent No. 1,807,822.

In the application of this process, the only condition to be observed is that the front plane of the corrugations of one of the films should remain constant relatively to the front plane of the corrugations of the other films; in a word, the corrugations of one of the films must not penetrate at certain points into the hollows separating the corrugations of the other, whilst at other points the reliefs are boss against boss.

The process which seems to give economically the best results consists in arranging the gauffered corrugations on the two films in such a manner that these of the original film should be slightly inclined relatively to those of the reproduction film. An obliquity of one to two degrees will be sufficient. It will be understood that in these conditions the front planes of the two gaufferings will remain strictly parallel, since the corrugations intersect at close points and are maintained in an invariable plane by the contacts of their reliefs at the points of intersection. The extreme smallness of the angle of inclination results in the corrugations of the two films playing optically as if they were strictly parallel; the colors are not modified therefore and the elimination of the blurs or fringes takes place in the same manner.

In the accompanying drawing, I have shown a selected embodiment of the manner in which the invention may be practiced. In the drawing:

Fig. 1 is a vertical section through a portion of a copying apparatus;
Fig. 2 is a view on the line 2—2 of Fig. 1.

The invention may be practiced by feeding the original film 1 and the copy film 2 by suitable sprockets, as indicated, past an exposure aperture 3 in a plate 4 while illuminating the aperture by a lamp 5 provided with a lens or lenses 6.

The original film 1 is adjacent the aperture 3 as indicated, and it will, of course, be understood that this film is in close contact with the portion of the plate surrounding the aperture, and that the two films are arranged with their goffered sides adjacent and in contact with each other, as is well known in the art.

As best shown in Fig. 2, the axes of the two films 1 and 2 are parallel to each other, and the gofferations are shown extending lengthwise of the two films. Ordinarily, these gofferations will be in the form of cylindrical lenticular elements commonly used in the art, and, as pointed out above, the gofferations on one film will bear a slight angle with relation to those on the other. In the form shown, I have indicated the relation of the gofferations on the two films by lines, without making any effort to show the exact form of the gofferations. The film 1 has the gofferations 7 extending parallel to its edges or, in other words, parallel to the longitudinal axis of the film, whereas the film 2 has the gofferations 8 thereon disposed at a slight angle to the film edge or to the longitudinal axis of the film. The showing of the relation between the gofferations 7 and 8 is somewhat exaggerated, it being understood that, as noted above, the angle between the gofferations on the two films is of the order of one or two degrees.

By this arrangement, when the two films are fed together at the same speed past the aperture 3, the angular relation of the gofferations means that, during the passage past the aperture, the gofferation on one film is displaced laterally with respect to the other an amount approximately equal to the width of one gofferation, as more fully brought out in my copending application, Serial No.

372,718, in which is disclosed a different method of accomplishing substantially the same result.

While I have shown the invention as embodied in a specific form, it is to be understood that various changes in details may be made without departing from the scope of the invention, and I therefore do not intend to limit myself except by the appended claims.

I claim:

1. The method of transferring an image from one film to the other, which comprises moving past an exposure aperture an original film having longitudinally arranged cylindrical lenticular elements thereon and at the same time moving past said aperture a copy film having longitudinally arranged cylindrical lenticular elements thereon, the elements on the copy film making an angle with respect to those on the original film of the order of 1° or 2°, but the longitudinal axes of the films being parallel.

2. The method of transferring an image from one film to the other, which comprises moving past an exposure aperture a film having refringent elements arranged thereon in parallel lines and simultaneously moving past said aperture a copy film also having refringent elements arranged thereon in parallel lines, the lines on one film making an angle with respect to those on the other film of the order of 1° or 2°, but the longitudinal axes of the films being parallel.

3. The method of transferring an image from one film to another, which comprises moving an original film past an exposure aperture, said film having thereon a multiplicity of refringent elements arranged in parallel rows extending lengthwise of the film and substantially parallel to its longitudinal axis while simultaneously moving past the aperture a copy film having thereon a multiplicity of refrigerent elements arranged in parallel rows lengthwise of the copy film but at an angle to the longitudinal axis of the copy film of the order of 1° or 2°, and while maintaining the axes of the two films parallel.

In testimony whereof, I affix my signature.

RODOLPHE BERTHON.